(12) United States Patent
Ban

(10) Patent No.: US 11,915,073 B2
(45) Date of Patent: Feb. 27, 2024

(54) NON-TRANSITORY COMPUTER-READABLE RECORDING MEDIUM STORING COMPUTER-READABLE INSTRUCTIONS FOR TERMINAL DEVICE, AND METHOD PERFORMED BY TERMINAL DEVICE FOR CAUSING LABEL PRINTER TO PERFORM PRINTING

(71) Applicant: BROTHER KOGYO KABUSHIKI KAISHA, Nagoya (JP)

(72) Inventor: Ryoji Ban, Ama (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/935,109

(22) Filed: Sep. 25, 2022

(65) Prior Publication Data
US 2023/0094288 A1 Mar. 30, 2023

(30) Foreign Application Priority Data
Sep. 30, 2021 (JP) .................. 2021-161379

(51) Int. Cl.
*G06K 15/02* (2006.01)

(52) U.S. Cl.
CPC ........ *G06K 15/1885* (2013.01); *G06K 15/024* (2013.01); *G06K 15/1802* (2013.01); *G06K 2215/0097* (2013.01)

(58) Field of Classification Search
CPC .................................. G06K 15/1885
USPC .......................................... 358/1.18
See application file for complete search history.

(56) References Cited

U.S. PATENT DOCUMENTS

| | | | | |
|---|---|---|---|---|
| 2014/0347412 | A1* | 11/2014 | Jintsugawa | B41J 3/4075 347/5 |
| 2020/0097222 | A1* | 3/2020 | Ishii | G06F 3/1243 |
| 2023/0094562 | A1* | 3/2023 | Ban | G06F 40/279 707/736 |

FOREIGN PATENT DOCUMENTS

| | | |
|---|---|---|
| JP | 2006-268388 A | 10/2006 |
| JP | 2013-206004 A | 10/2013 |
| JP | 2020-110974 A | 7/2020 |

* cited by examiner

*Primary Examiner* — Jacky X Zheng
(74) *Attorney, Agent, or Firm* — KENEALY VAIDYA LLP

(57) ABSTRACT

A terminal device may generate a first label file based on a specific label file. The specific label file may include one or more object regions in which a print target object is to be placed and first text information written in a first object region of the one or more object regions. The first label file may include the one or more object regions and does not include the first text information. The terminal device may generate a first database file associated with the first label file. The first database file may store a first field name corresponding to the first object region and a first text obtained by using the first text information in association with each other. The terminal device may generate first print data by using the first label file and the first database file, and send the first print data to a label printer.

10 Claims, 9 Drawing Sheets

(Continuation of FIG. 2)

(Continuation of FIG. 3)

(Continuation of FIG. 7)

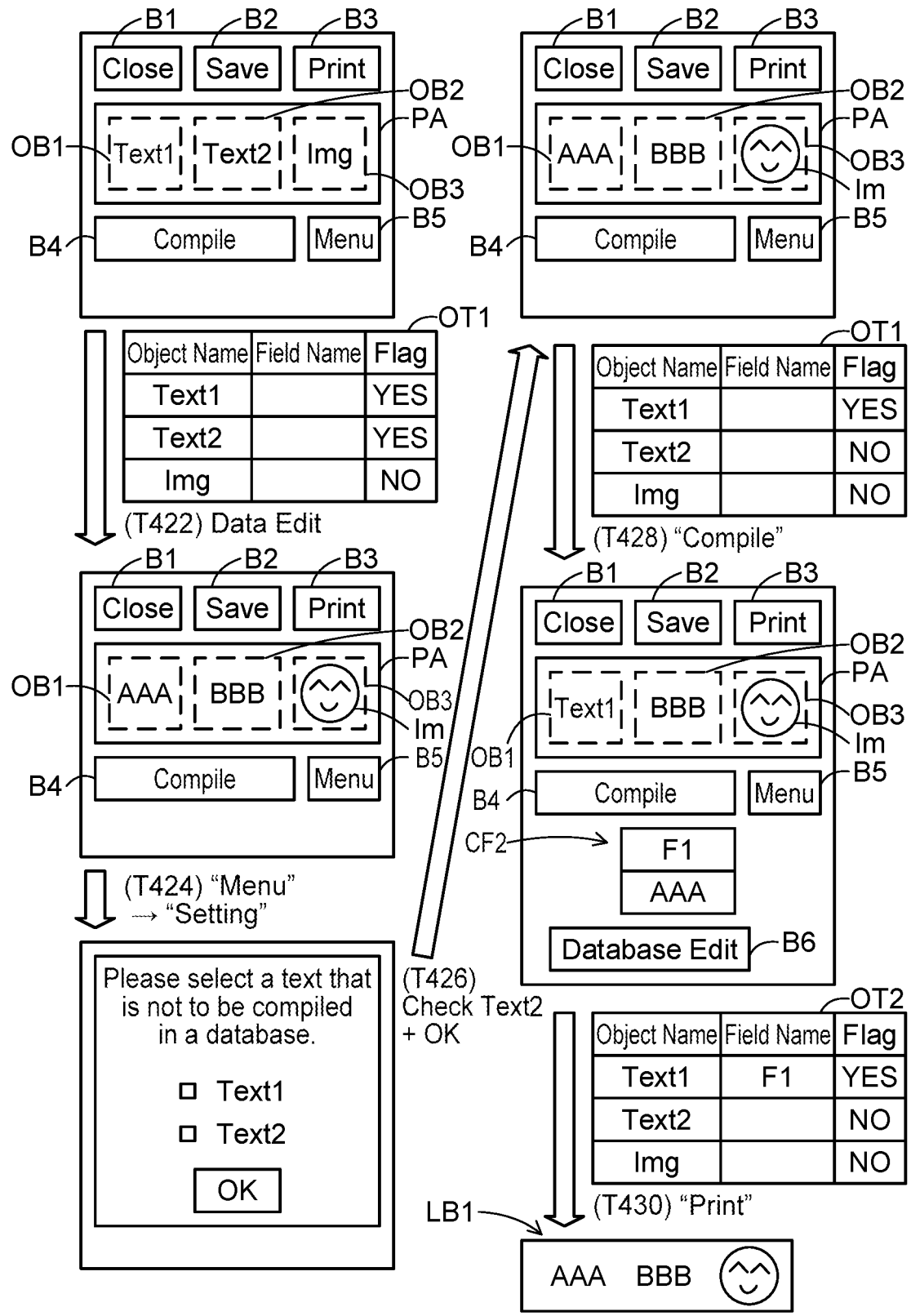

NON-TRANSITORY COMPUTER-READABLE RECORDING MEDIUM STORING COMPUTER-READABLE INSTRUCTIONS FOR TERMINAL DEVICE, AND METHOD PERFORMED BY TERMINAL DEVICE FOR CAUSING LABEL PRINTER TO PERFORM PRINTING

REFERENCE TO RELATED APPLICATION

This application claims priority to Japanese Patent Application No. 2021-161379 filed on Sep. 30, 2021. The entire content of the priority application is incorporated herein by reference.

BACKGROUND ART

Printing labels by using a database is known. In the database-using printing, data read out from the database is placed at a predetermined position and printed.

To create the database above, a user has to, for example, input various different texts to the database. The disclosure herein provides a technology for improving user convenience in creating a database file used by a label printer to print.

DESCRIPTION

A non-transitory computer-readable recording medium storing computer-readable instructions for a terminal device is disclosed herein. The computer-readable instructions, when executed by a processor of the terminal device, may cause the terminal device to: in a case where a preparation instruction for printing using a database file is obtained in a state where a specific label file exists, generate a first label file based on the specific label file, wherein the specific label file includes one or more object regions in which a print target object is to be placed and first text information written in a first object region of the one or more object regions, and the first label file includes the one or more object regions and does not include the first text information; in the case where the preparation instruction is obtained in the state where the specific label file exists, generate a first database file associated with the first label file, wherein the first database file stores a first field name corresponding to the first object region and a first text obtained by using the first text information in association with each other; in a case where a first print instruction for printing using the first label file is obtained after the first label file and the first database file have been generated, generate first print data by using the first label file and the first database file associated with the first label file, wherein in the first print data, the first text information obtained by using the first text stored in the first database file is written in the first object region corresponding to the first field name associated with the first text; and send the first print data to a label printer.

According to the configuration above, the terminal device generates the first label file based on the specific label file in response to obtaining the preparation instruction. The terminal device, in response to obtaining the preparation instruction, further generates the first database file including the first field name corresponding to the first object region and the first text obtained by using the first text information included in the specific label file. When a user wishes to generate a database file to be used by the label printer to print, he/she can easily generate the first database file without inputting the first text. Thus, user convenience can be improved.

A terminal device itself implemented by the above computer-readable instructions, and a method performed by the above terminal device are also novel and useful.

FIG. 9 illustrates a transition of screens.

Figure 1:
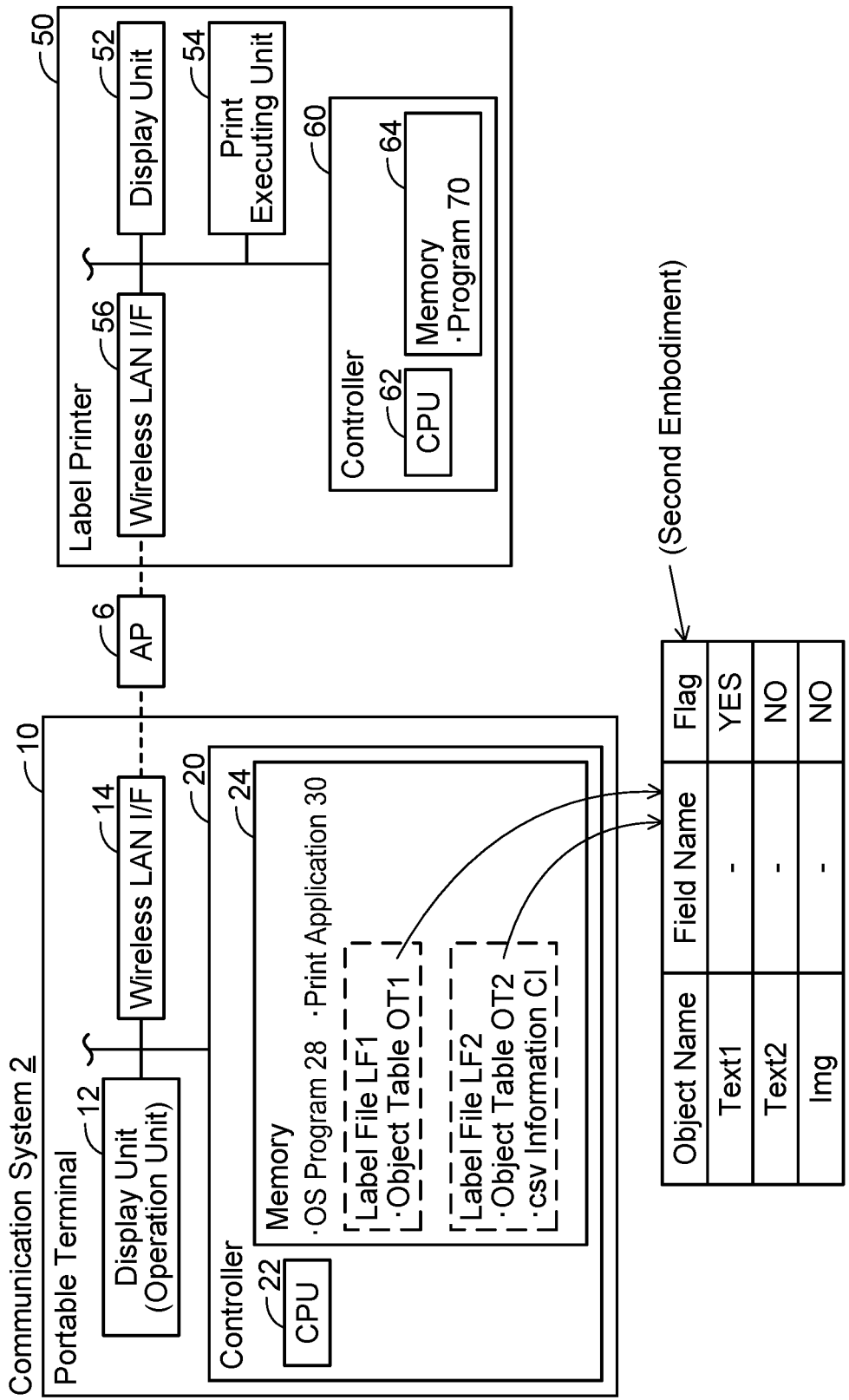
FIG. 1 illustrates a configuration of a communication system.

(Configuration of Communication System 2; FIG. 1)

As illustrated in FIG. 1, a communication system 2 comprises a portable terminal 10 and a label printer 50. The portable terminal 10 and the label printer 50 each have a current wireless connection with an access point (AP) 6. Thus, the portable terminal 10 and the label printer 50 are communicable with each other via the AP 6.

In the present embodiment, a user generates a label that is attachable to an object to be managed, by using the devices 10, 50. The label is generated by the label printer 50 printing a label image on a sticker. The portable terminal 10 generates a label file which is a data file representing the label image and sends print data obtained from the label file to the label printer 50. Especially in the present embodiment, the portable terminal 10 can generate a new label file and comma separated value (csv) file based on a single label file. The portable terminal 10 then can cause the label printer 50 to execute printing using the label file and csv file.

(Configuration of Portable Terminal 10; FIG. 1)

The portable terminal 10 is a mobile terminal device such as a cellphone, a smartphone, a PDA, a laptop PC, a tablet PC, or the like. The portable terminal 10 comprises a display unit 12, a wireless LAN interface 14, and a controller 20. Hereinafter, interface will be abbreviated as "I/F".

The display unit 12 is a display for displaying various information. The display unit 12 also functions as a so-called touch screen. Thus, the user can input various instructions to the portable terminal 10 by operating a plurality of keys displayed on the display unit 12. That is, the display unit 12 also functions as an operation unit.

The wireless LAN I/F 14 is an I/F for Wi-Fi communication according to a Wi-Fi scheme and has a current wireless connection with the AP 6. The Wi-Fi scheme is a wireless communication scheme according to standard 802.11 of The Institute of Electrical and Electronics Engineers Inc. (IEEE) and standards complying therewith (e.g., 802.11a, 11b, 11g, 11n, 11ac, etc.).

The controller 20 comprises a CPU 22 and a memory 24. The CPU 22 executes various processes in accordance with an OS (operating system) program 28, a print application 30, etc. stored in the memory 24. The memory 24 is configured of a volatile memory, a non-volatile memory, etc. Hereinafter, the OS program 28 and the print application 30 will be abbreviated as "OS 28" and "print app 30", respectively.

The OS 28 is a program for controlling various basic operations of the portable terminal 10. The print app 30 is an application for causing the label printer 50 to print a label using the portable terminal 10. The print app 30 is, for example, an application provided by the vender of the label printer 50 and is installed in the portable terminal 10 from a server (not illustrated) on the Internet.

The memory 24 further stores two label files LF1 and LF2. In the present embodiment, it is assumed that the user first generates the label file LF1 and then the label file LF2 is generated based on the label file LF1.

The label file LF1 includes an object table OT1. The label file LF2 includes an object table OT2 and csv information CI. The object tables OT1, OT2 will be described later in detail. The csv information CI is information for identifying a csv file associated with the label file LF2 (e.g., information indicating the file path of a csv file).

(Configuration of Label Printer 50; FIG. 1)

The label printer 50 is a peripheral device (e.g., a peripheral device of the portable terminal 10) that has a print function of printing a label image on a sticker to generate a label. The label printer 50 comprises a display unit 52, a print executing unit 54, a wireless LAN I/F 56, and a controller 60.

The display unit 52 is a display for displaying various information. The print executing unit 54 is a print mechanism of so-called thermal transfer scheme and generates a label by transferring a label image to a sticker. In a modification, the print executing unit 54 may be a print mechanism of inkjet scheme, laser scheme, or the like. The wireless LAN I/F 56 is the same as the wireless LAN I/F 14 described above.

The controller 60 comprises a CPU 62 and a memory 64. The CPU 62 executes various processes in accordance with a program 70 stored in the memory 64. The memory 64 is configured of a volatile memory, a non-volatile memory, etc.

(Case A; FIGS. 2 to 5)

Contents of a process executed by the CPU 22 in accordance with the print app 30 will be described. Referring to FIGS. 2 to 5, Case A will be described. In Case A, a label file LF1 is generated by the user, and a label file LF2 and a csv file CF1 are generated based on the label file LF1.

When the print app 30 (i.e., the CPU 22) accepts an operation for generating a new label file from the user, the print app 30 newly generates a label file LF1 representing a label image which is blank. Then, the print app 30 displays a preview screen (the upper left screen in FIG. 2) corresponding to the label file LF1 on the display unit 12. The preview screen includes a preview region PA indicating a preview of the label image (which is blank at this time) and a plurality of buttons B1 to B5. The user can edit the label image in the preview region PA.

The plurality of buttons B1 to B5 includes a close button B1, a save button B2, a print button B3, a compile button B4, and a menu button B5. The close button B1 is a button to close the preview screen. The save button B2 is a button to save an edited label image (i.e., an edited label file). The print button B3 is a button to cause the label printer 50 to print the label image. The compile button B4 is a button to generate a new label file and csv file based on the label file LF1. The menu button B5 is a button to select various items related to the label file LF1.

In T10, the print app 30 accepts selection of the menu button B5 from the user. In this case, the print app 30 displays a menu screen MS over the currently displayed preview screen (see the lower left screen in FIG. 2). The menu screen MS includes a generate button (i.e., a letter string "generate") to newly generate an object region in which a print target object (e.g., a text, an image, etc.) is to be placed and a setting button (i.e., a letter string "setting") to change settings related to the object table OT1. Hereinafter, object will be abbreviated as "OB".

The print app 30 accepts selection of the generate button in the menu screen MS from the user in T12. After accepting the selection of the generate button in T12, the print app 30 accepts from the user an instruction that indicates an OB region in which a text is to be placed (which will be termed "text OB region" hereinafter) is to be generated, although this is not illustrated. In this case, the print app 30 generates a new OB region OB1 in the preview region PA (see the upper right screen in FIG. 2). The OB region OB1 has a text (i.e., "Text1"), which indicates that this OB region is a text OB region, written therein (see the upper right screen in FIG. 2).

Upon generating the text OB region OB1, the print app 30 further generates an OB table OT1 in the label file LF1. The OB table OT1 stores an OB name indicating an OB region included in the label file LF1 (which is "Text1" in the present embodiment) and a field name included in a csv file (which will be described later) in association with each other. Since no csv files have been associated with the label file LF1 at this time, the field name associated with the OB name "Text1" indicates blank.

After accepting selection of the menu button B5 again, the print app 30 accepts selection of the generate button in the menu screen MS in T14. After the selection of the generate button, the print app 30 accepts from the user an instruction that indicates a text OB region is to be generated, although this is not illustrated. In this case, the print app 30 generates a new OB region OB2 in the preview region PA (see the lower right screen in FIG. 2). The OB region OB2 has a text (i.e., "Text2"), which indicates that this OB region is a text OB region, written therein. The print app 30 adds an OB name "Text2" to the OB table OT1 in the label file LF1. The field name associated with the OB name "Text2" also indicates blank.

After accepting selection of the menu button B5 again, the print app 30 accepts selection of the generate button in the menu screen MS in T20. After accepting the selection of the generate button in T20, the print app 30 accepts from the user an instruction that indicates an OB region in which an image is to be placed (which will be termed "image OB region" hereinafter) is to be generated, although this is not illustrated.

Figure 2:
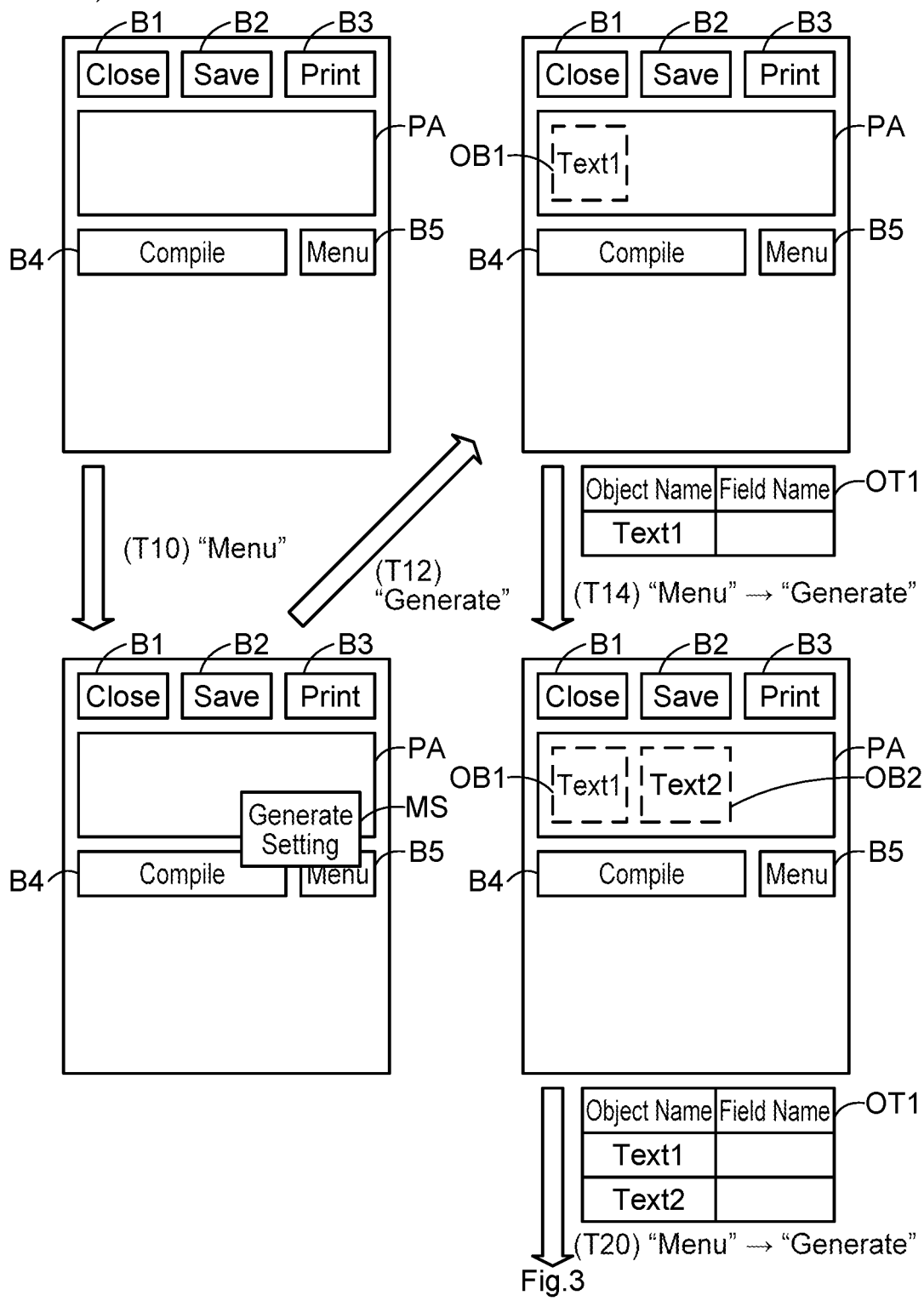
FIG. 2 illustrates a transition of screens in Case A.
Figure 3:
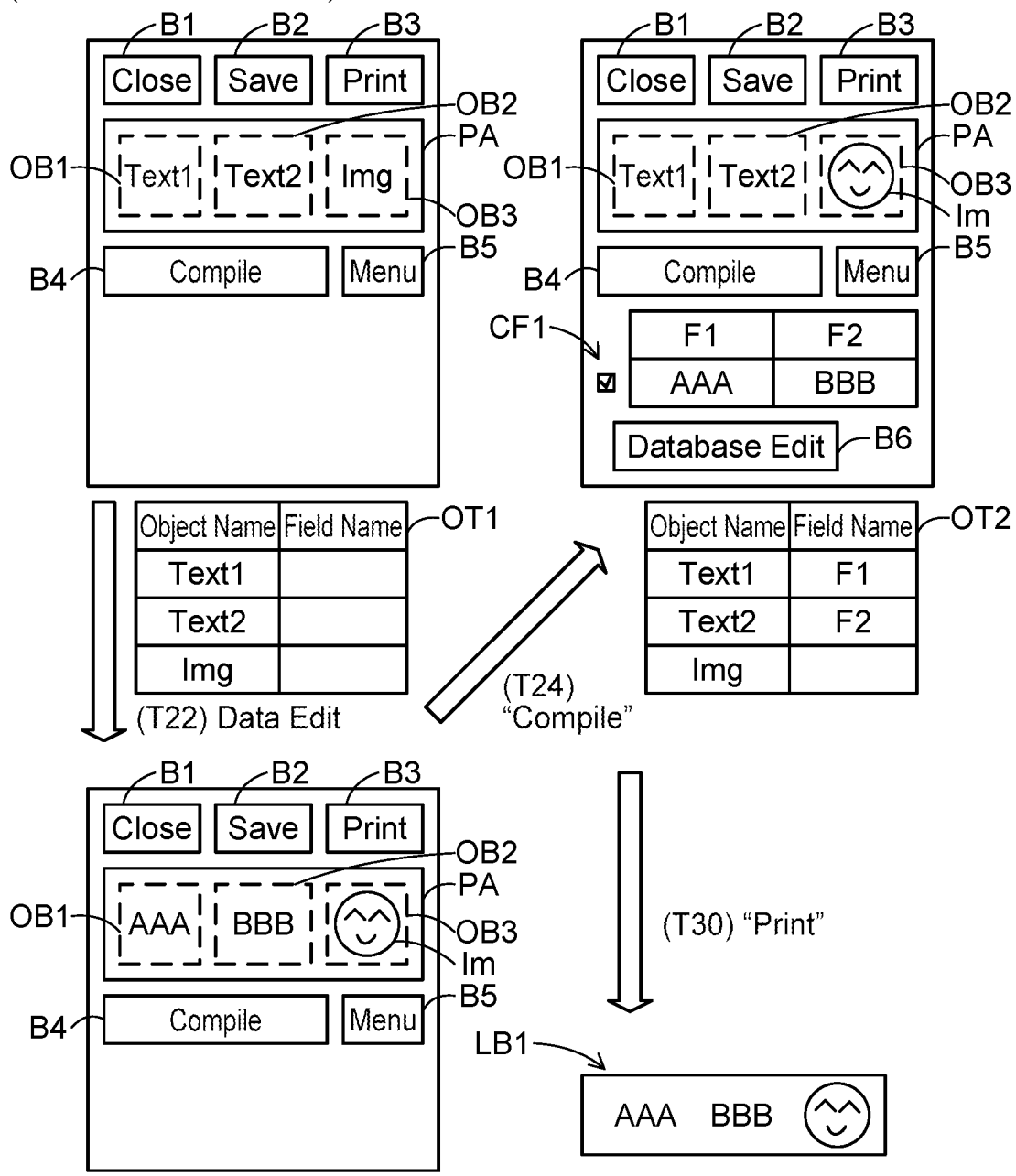
FIG. 3 illustrates a transition of screens continued from FIG. 2.

(Continuation from FIG. 2; FIG. 3)

When the print app 30 accepts from the user the instruction indicating an image OB region is to be generated (T20 in FIG. 2), the print app 30 generates a new OB region OB3 in the preview region PA (see the upper left screen in FIG. 3). The OB region OB3 has a text (i.e., "Img"), which indicates that this OB region is an image OB region, written therein. The print app 30 adds an OB name "Img" to the OB table OT1 in the label file LF1. The field name associated with the OB name "Img" also indicates blank.

The print app 30 accepts an editing operation from the user in T22. Specifically, the print app 30 first accepts an operation of inputting a text "AAA" in the text OB region OB1. Then, the print app 30 accepts an operation of inputting a text "BBB" in the text OB region OB2. The print app 30 then accepts an operation of placing an image Im in the image OB region OB3. As a result, a preview of a label image, in which the text "AAA" is written in the text OB region OB1, the text "BBB" is written in the text OB region OB2, and the image Im is placed in the image OB region OB3, is displayed (see the lower left screen in FIG. 3).

Thereafter, the print app 30 executes the following processes upon accepting selection of the compile button B4 from the user in T24. First, the print app 30 copies the label file LF1 to generate a label file that is identical with the label file LF1. Hereinafter, this label file will be termed "intermediate label file". In the intermediate label file, the print app 30 identifies the two text OB regions OB1, OB2 other than the image OB region. Then, the print app 30 deletes from the intermediate label file the texts written in these two text OB regions (i.e., "AAA" and "BBB"). Thus, the print app 30 generates a label file LF2 that includes the two text OB regions OB1, OB2 and the image OB region OB3 in which the image Im is placed. The two text OB regions from which the texts have been deleted have the texts "Text1" and "Text2", which indicate these OB regions are text OB regions, written therein, respectively.

Upon accepting selection of the compile button B4 from the user, the print app 30 further generates a csv file CF1. The csv file CF1 is generated as follows. First, the print app 30 writes a single-row record that includes the two texts "AAA" and "BBB", which have been deleted from the intermediate label file, in the csv file CF1.

Then, the print app 30 adds a field name F1 to the column in which the text "AAA" is written and a field name F2 to the column in which the text "BBB" is written. Thus, the csv file CF1 in which the field name F1 is stored in association with the text "AAA" and the field name F2 is stored in association with the text "BBB" is generated.

Further, the print app 30 generates an OB table OT2 in the label file LF2. The OB table OT2 stores the field name F1 in association with the OB name "Text1" which corresponds to the text OB region OB1 from which the text "AAA" has been deleted and stores the field name F2 in association with the OB name "Text2" which corresponds to the text OB region OB2 from which the text "BBB" has been deleted. The field name associated with the OB name "Img" indicates blank also in the OB table OT2. The print app 30 further generates csv information CI in the label file LF2.

After generating the label file LF2 and the csv file CF1, the print app 30 displays a preview screen corresponding to the label file LF2 on the display unit 12, as illustrated in the upper right screen in FIG. 3. This preview screen is the same as the upper left preview screen in FIG. 2 except for displaying different information in the preview region PA, displaying the information included in the csv file CF1, and including a database edit button B6. The database edit button B6 is a button to edit the csv file CF1. The csv file CF1 in the preview screen includes a check box corresponding to the row in which the texts "AAA" and "BBB" are written. In an initial state, the check box is checked.

The print app 30 accepts selection of the print button B3 from the user in T30. In this case, the print app 30 generates one piece of print data as follows. The print app 30 generates first print data based on the information in the first row of the csv file CF1 (i.e., "AAA" and "BBB"). Specifically, the print app 30 identifies the text "AAA" associated with the field name F1 in the csv file CF1. The print app 30 then identifies the OB name "Text1" associated with the field name F1 in the OB table OT2. Then, the print app 30 writes the identified text "AAA" in the OB region OB1 corresponding to the identified OB name "Text1". Similarly, the print app 30 identifies the text "BBB" associated with the field name F2 in the csv file CF1 and identifies the OB name "Text2" associated with the field name F2 in the OB table OT2. Then, the print app 30 writes the identified text "BBB" in the OB region OB2 corresponding to the identified OB name "Text2". The first print data is generated as described above.

The print app 30 sends the first print data to the label printer 50 via the wireless LAN I/F 14.

The label printer 50 receives the first print data from the portable terminal 10 via the wireless LAN I/F 56. The label printer 50 generates a label LB1 by printing a label image represented by the first print data onto a sticker. Thus, the print app 30 can cause the label printer 50 to execute printing using the csv file CF1 generated based on the label file LF1.

Figure 4:
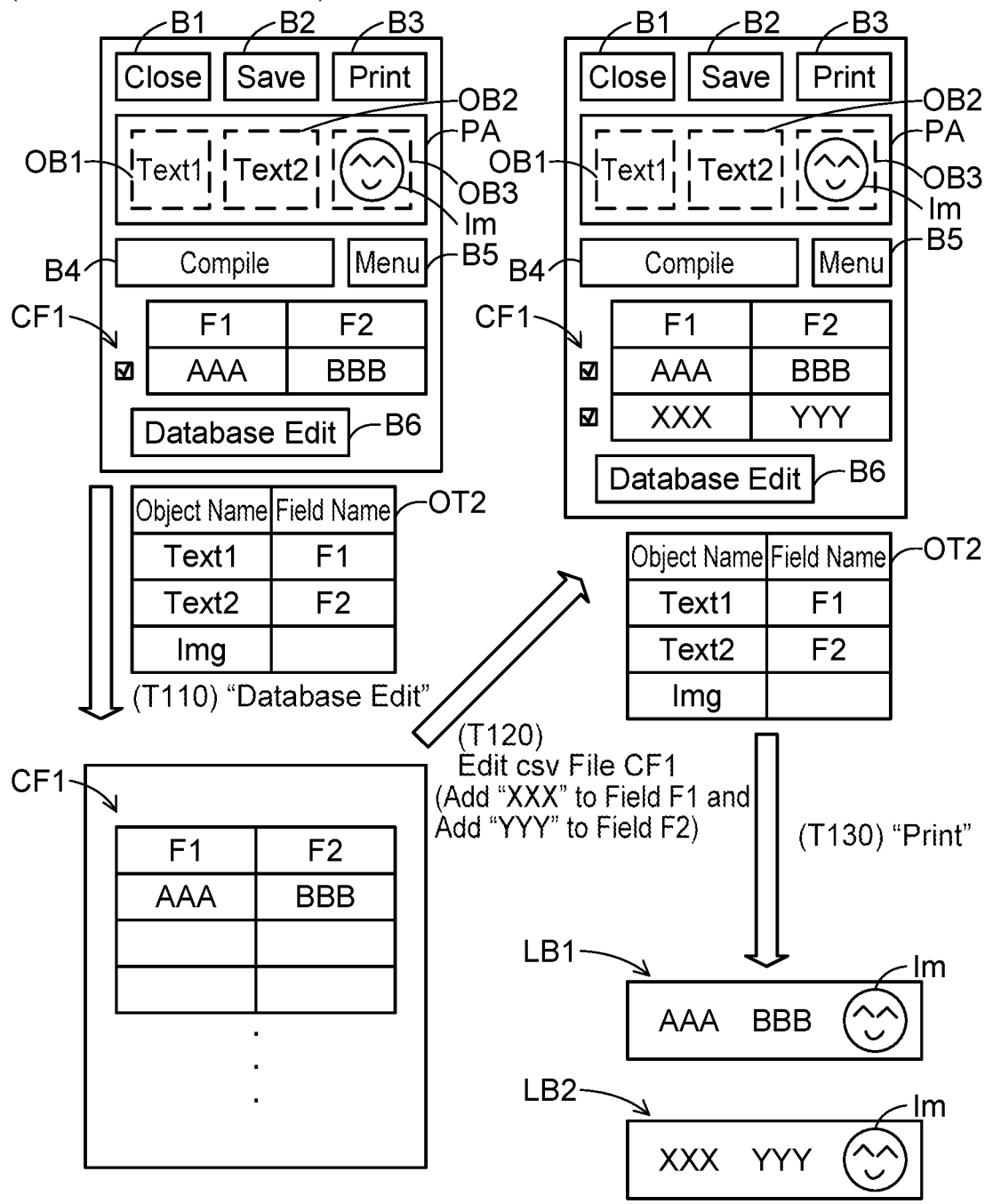
FIG. 4 illustrates a transition of screens continued from FIG. 3.

(Continuation from FIG. 3; FIG. 4)

In T110 of FIG. 4, the print app 30 accepts selection of the database edit button B6 from the user. In this case, the print app 30 displays an editing screen for editing the csv file CF1 on the display unit 12, as illustrated in the lower left screen in FIG. 4. The user can edit the csv file CF1 (e.g., add text(s) to the csv file CF1) on this screen.

The print app 30 accepts an editing operation to the csv file CF1 from the user in T120. Specifically, the print app 30 first accepts an operation of adding a text "XXX" to the second row at the column with the field name F1 (i.e., to the cell one row below the cell in which "AAA" is written). The print app 30 then accepts an operation of adding a text "YYY" to the second row at the column with the field name F2 (i.e., to the cell one row below the cell in which "BBB" is written).

Then, upon accepting selection of an edit complete button (not illustrated), the print app 30 displays a preview screen corresponding to the label file LF2 on the display unit 12, as illustrated in the upper right screen in FIG. 4. This preview screen is the same as the upper left preview screen in FIG. 4 except that the text "XXX" and the text "YYY" have been added as information included in the csv file CF1. At this time, all check boxes corresponding to all rows are checked.

The print app 30 accepts selection of the print button B3 in T130. In this case, the print app 30 generates two pieces of print data as follows. First, the print app 30 generates first print data in the same way as described above. Then, the print app 30 generates additional print data based on the information included in the second row in the csv file CF1 (i.e., "XXX" and "YYY"). The additional print data is generated in the same way as the first print data is generated except that the two texts "XXX" and "YYY" are used. The print app 30 sequentially sends the first print data and the additional print data to the label printer 50 via the wireless LAN I/F 14.

The label printer 50 sequentially receives the first print data and the additional print data from the portable terminal 10 via the wireless LAN I/F 56. The label printer 50 generates a label LB1 by printing a label image represented by the first print data onto a sticker. The label printer 50 generates a label LB2 by printing a label image represented by the additional print data onto a sticker. Thus, the print app 30 can cause the label printer 50 to execute printing using the csv file CF1 edited by the user.

Figure 5:
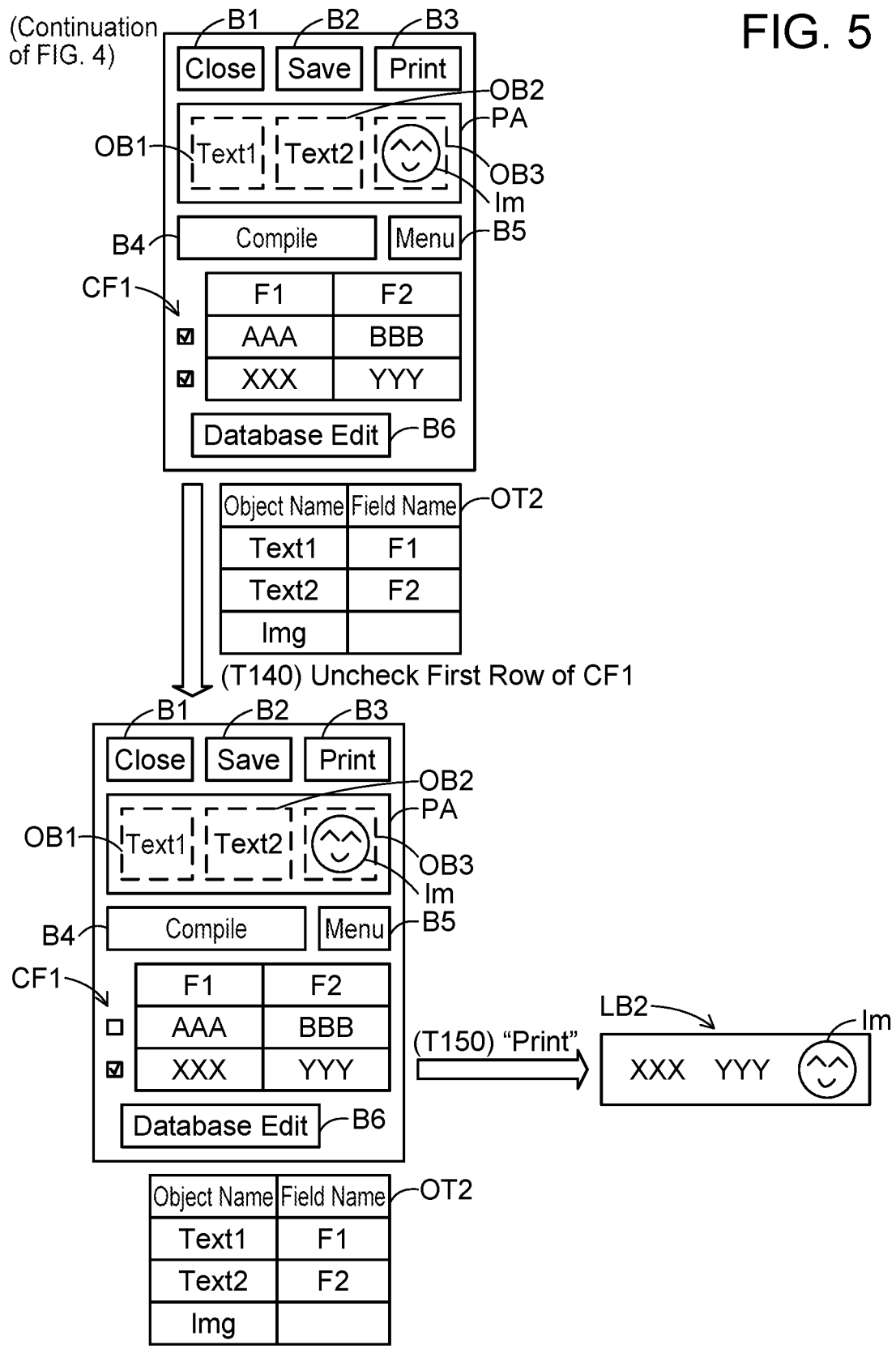
FIG. 5 illustrates a transition of screens continued from FIG. 4.

(Continuation from FIG. 4; FIG. 5)

Thereafter, in T140, the print app 30 accepts from the user an operation of unchecking the check box corresponding to the first row in the csv file CF1 (see the lower screen in FIG. 5) on the preview screen (see the upper right screen in FIG. 4).

Then, the print app 30 accepts selection of the print button B3 from the user in T150. In this case, the print app 30 does not generate the first print data based on the unselected information in the first row in the csv file CF1 (i.e., the texts "AAA" and "BBB") but generates only the additional print data based on the information in the second row (i.e., the texts "XXX" and "YYY"), and sends the additional print data to the label printer 50 via the wireless LAN I/F 14. As a result, only the label LB2 is generated at the label printer 50. Thus, the user can cause the label printer 50 to generate only the label LB2 on which desired information in the csv file CF1 is written.

Figure 6:
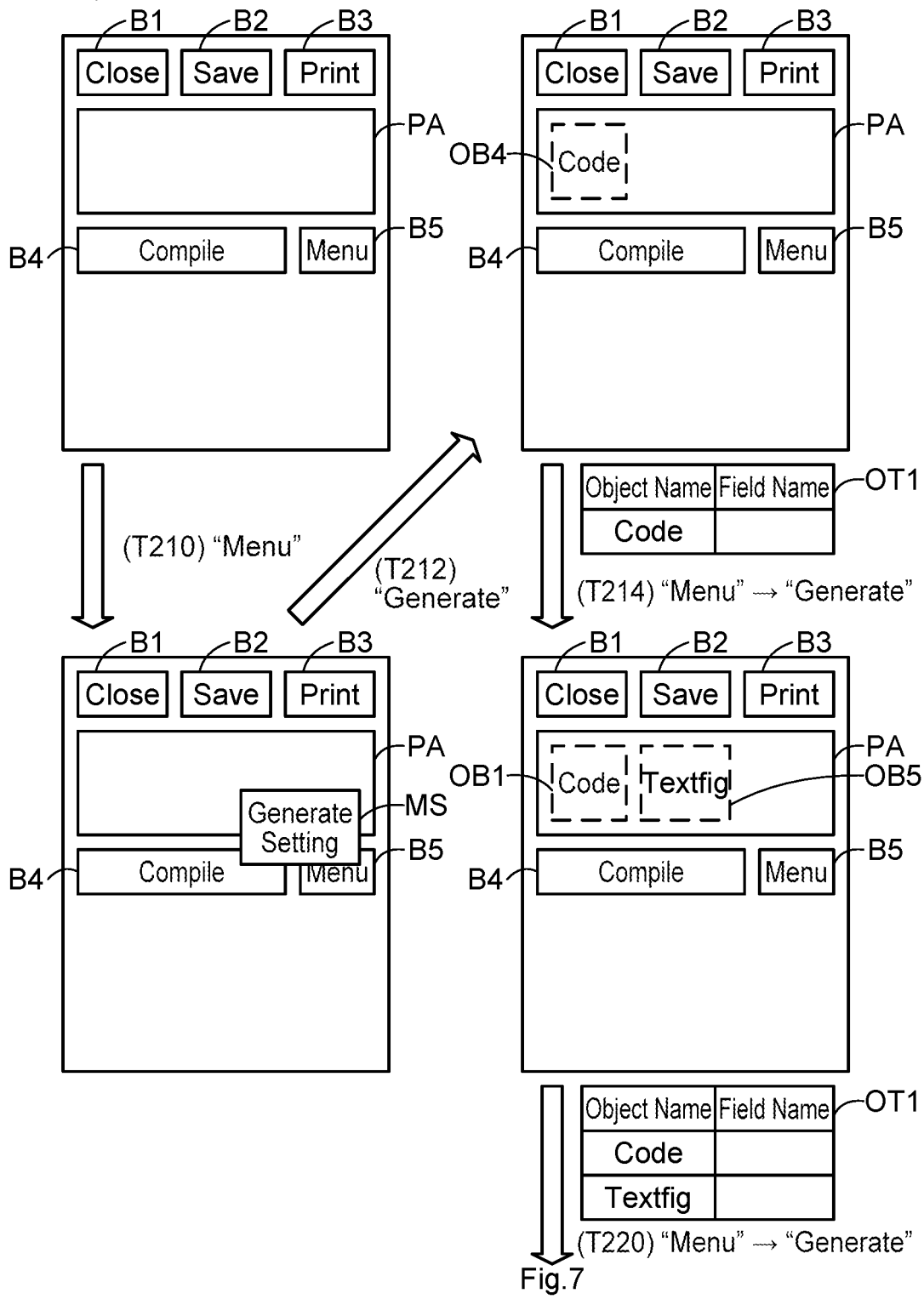
FIG. 6 illustrates a transition of screens in Case B.
Figure 7:
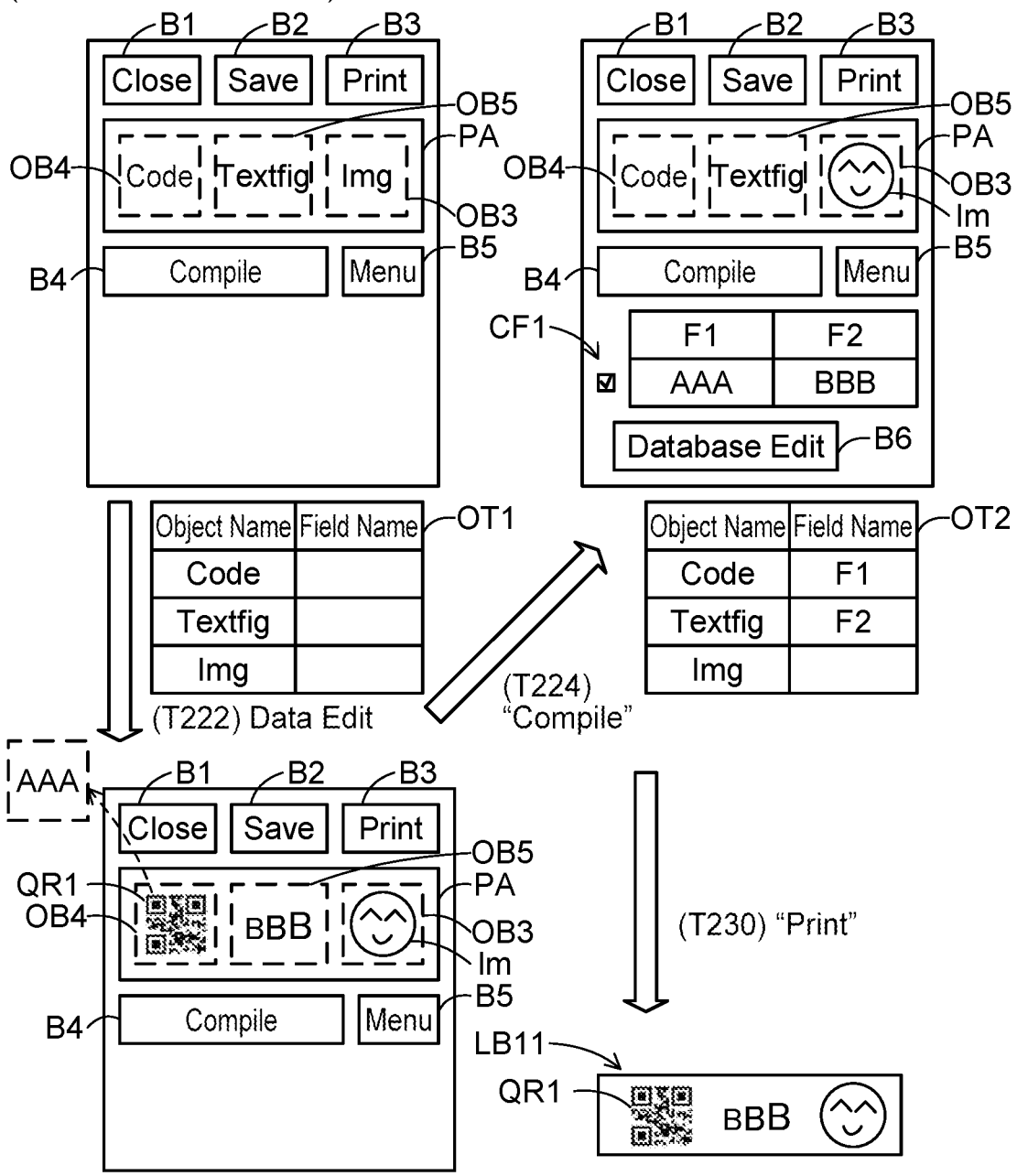
FIG. 7 illustrates a transition of screens continued from FIG. 6.
Figure 8:
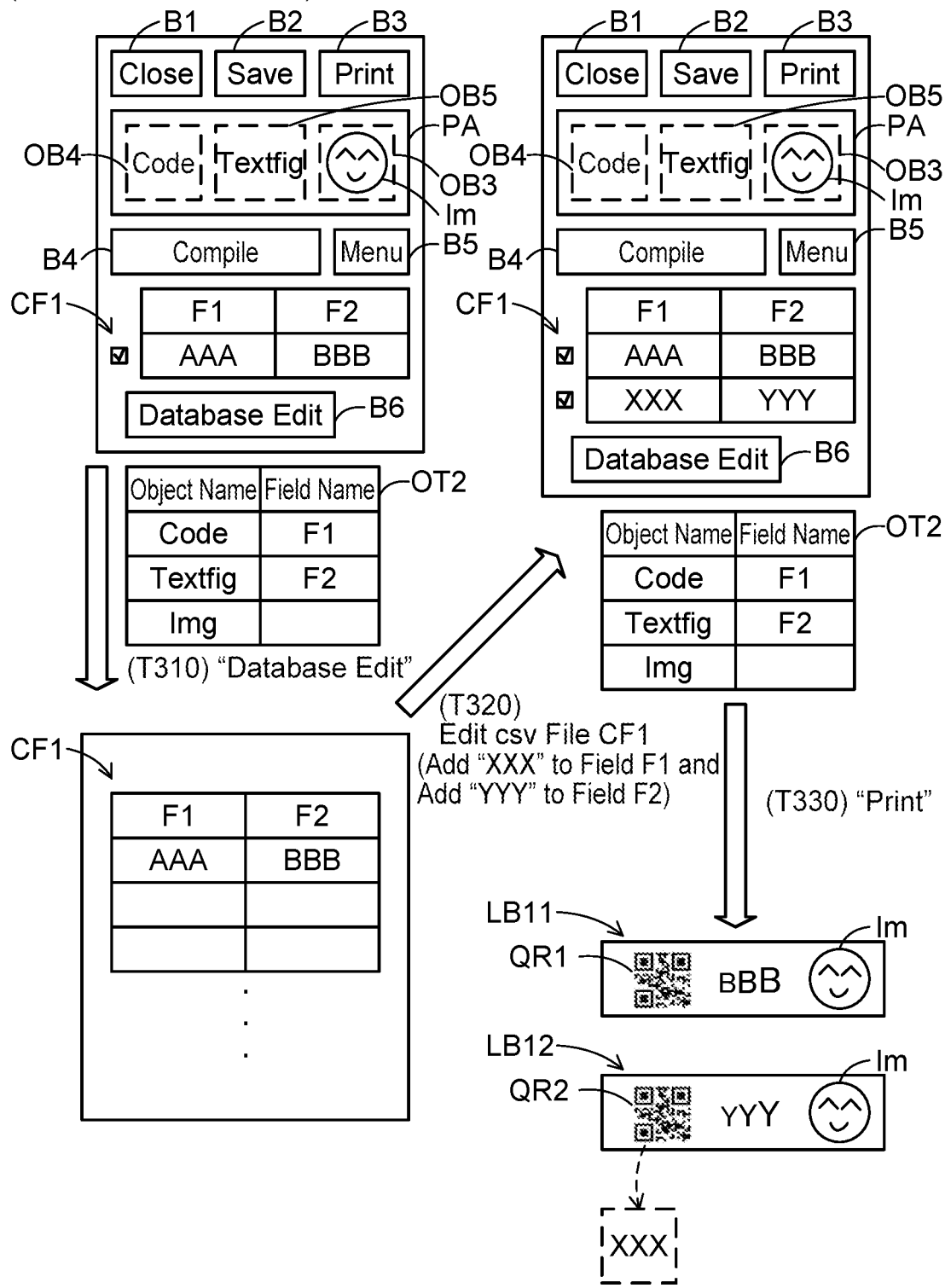
FIG. 8 illustrates a transition of screens continued from FIG. 7.

(Case B; FIGS. 6 to 8)

Next, referring to FIGS. 6 to 8, Case B will be described. Case B is different from Case A in types of OB regions included in the label file LF1. The upper left screen in FIG. 6 is the same as the upper left screen in FIG. 2. Further, T210 is the same as T10 in FIG. 2.

After accepting selection of the generate button in T212, the print app 30 accepts from the user an instruction that indicates an OB region in which a code image obtained by coding a text is to be placed (which will be termed "code OB region" hereinafter) is to be generated. In this case, the print app 30 generates a new OB region OB4 in the preview region PA. The OB region OB4 has a text (i.e., "Code"), which indicates that this OB region is a code OB region, written therein (see the upper right screen in FIG. 6).

When generating the code OB region OB4, the print app 30 further generates an OB table OT1 in the label file LF1. The OB table OT1 stores an OB name indicating a code OB region (which is "Code" in the present embodiment) and a field name included in a csv file (which will be described later) in association with each other. At this time, the field name associated with the OB name "Code" indicates blank.

T214 is the same as T14 in FIG. 2 except that an instruction to generate an OB region in which a text figure generated from a text (which will be termed "text figure OB region" hereinafter) is accepted. As a result, the print app 30 generates a new text figure OB region OB5 in the preview region PA. The OB region OB5 has a text (i.e., "Textfig"), which indicates this OB region is a text figure OB region, written therein (see the lower right screen in FIG. 6). The print app 30 adds an OB name "Textfig" to the OB table OT1. The field name associated with the OB name "Textfig" also indicates blank. T220 is the same as T20 in FIG. 2.

(Continuation from FIG. 6; FIG. 7)

The print app 30 accepts a data editing operation from the user in T222. Specifically, the print app 30 first accepts an operation of inputting a text "AAA" while the code OB region OB4 is designated. In this case, the print app 30 generates a QR Code (registered trademark) QR1 by coding the text "AAA". The print app 30 then places the QR code QR1 in the code OB region OB4. Next, the print app 30 accepts an operation of inputting a text "BBB" while the text figure OB region OB5 is designated. In this case, the print app 30 generates a text figure "BBB" from the text "BBB". The print app 30 then places the text figure "BBB" in the text figure OB region OB5. Here, a "text figure" means an object obtained by using text(s), and in the present embodiment, it is an object in which letters gradually increase in size toward the rightmost letter.

Upon accepting selection of the compile button B4 in T224, the print app 30 executes the following processes. First, the print app 30 copies the label file LF1 to generate an intermediate label file which is identical with the label file LF1. The print app 30 identifies the two OB regions other than the image OB region (i.e., the code OB region OB4 and the text figure OB region OB5) in the intermediate label file. The print app 30 then deletes the QR Code and the text figure placed in the two OB regions respectively from the intermediate label file. Thus, the print app 30 generates a label file LF2 that includes the code OB region OB4, the text figure OB region OB5, and the image OB region OB3 in which the image Im is placed. The code OB region from which the QR Code has been deleted has the text "Code", which indicates that this OB region is a code OB region, written therein. Further, the text figure OB region from which the text figure has been deleted has the text "Textfig", which indicates that this OB region is a text figure OB region, written therein.

Upon accepting the selection of the compile button B4 from the user, the print app 30 further generates a csv file CF1. The csv file CF1 is generated as follows. First, the print app 30 identifies the text "AAA" by decoding the QR Code QR1 deleted from the intermediate label file. Then, the print app 30 identifies the text "BBB" from the text figure "BBB" deleted from the intermediate label file. The print app 30 then writes a single-row record including these texts "AAA" and "BBB" in the csv file CF1. Then, the print app 30 adds a field name F1 to the column in which the text "AAA" is written and adds a field name F2 to the column in which the text "BBB" is written. Thus, the csv file CF1 in which the field name F1 is stored in association with the text "AAA" and the field name F2 is stored in association with the text "BBB" is generated.

Further, the print app 30 generates an OB table OT2 in the label file LF2. The OB table OT2 stores the OB name "Code" indicating a code OB region in association with the field name F1 and stores the OB name "Textfig" indicating a text figure OB region in association with the field name F2. The print app 30 further generates csv information CI in the label file LF2.

After generating the label file LF2 and the csv file CF1, the print app 30 displays a preview screen corresponding to the label file LF2 on the display unit 12, as illustrated in the upper right screen in FIG. 7. This preview screen is the same as the upper right preview screen in FIG. 3 except for including the code OB region OB4, the text figure OB region OB5, and the image OB region OB3 as the three OB regions included in the preview region PA.

The print app 30 accepts selection of the print button B3 from the user in T230. In this case, the print app 30 generates one piece of print data as follows. The print app 30 generates first print data based on the information in the first row in the csv file CF1 (i.e., "AAA" and "BBB"). Specifically, the print app 30 identifies the text "AAA" associated with the field name F1 in the csv file CF1. Then, the print app 30 identifies the OB name "Code" associated with the field name F1 in the OB table OT2. The print app 30 then places a QR Code obtained by coding the identified text "AAA" (i.e., QR1) in the OB region OB4 corresponding to the identified OB name "Code". Similarly, the print app 30 identifies the text "BBB" associated with the field name F2 in the csv file CF1 and identifies the OB name "Textfig" associated with the field name F2 in the OB table OT2. The print app 30 then places a text figure "BBB" obtained from the identified text "BBB" in the OB region OB5 corresponding to the identified OB name "Textfig". Thus, the first print data is generated. The print app 30 sends the first print data to the label printer 50 via the wireless LAN I/F 14.

The label printer 50 receives the first print data from the portable terminal 10 via the wireless LAN I/F 56. The label printer 50 generates a label LB11 by printing a label image represented by the first print data onto a sticker. Thus, the print app 30 can cause the label printer 50 to execute printing using the csv file CF1 generated based on the label file LF1.

(Continuation from FIG. 7; FIG. 8)

T310 and T320 in FIG. 8 are the same as T110 and T120 in FIG. 4. The print app 30 then accepts selection of the print button B3 in T330. In this case, the print app 30 generates two pieces of print data as follows. First, the print app 30 generates first print data in the same way as described above.

Then, the print app 30 generates additional print data based on the information in the second row in the csv file CF1 (i.e., "XXX" and "YYY"). The additional print data is generated in the same way as the first print data is generated except that the two texts "XXX" and "YYY" are used. The print app 30 sequentially sends the first print data and the additional print data to the label printer 50 via the wireless LAN I/F 14.

The label printer 50 sequentially receives the first print data and the additional print data from the portable terminal 10 via the wireless LAN I/F 56. The label printer 50 generates a label LB11 by printing a label image represented by the first print data onto a sticker. The label printer 50 generates a label LB12 by printing a label image represented by the additional print data onto a sticker. Thus, the print app 30 can cause the label printer 50 to execute printing using the csv file CF1 edited by the user.

(Effects of First Embodiment)

According to the configuration above, the portable terminal 10 generates the label file LF2 based on the label file LF1 upon accepting selection of the compile button B4. The portable terminal 10 generates the csv file CF1 upon accepting the selection of the compile button B4. The csv file CF1 includes the field names F1, F2, the text "AAA", etc. Thus, when wishing to generate the csv file CF1 to be used by the label printer 50 to print, the user can easily generate the csv file CF1 without inputting texts. Thus, user convenience can be improved. Then, the portable terminal 10 can cause the label printer 50 to execute printing using the generated csv file CF1.

(Correspondence Relationships)

The portable terminal 10 and the label printer 50 are examples of "terminal device" and "label printer", respectively. The print app 30 is an example of "computer-readable instructions". The label file LF1 is an example of "specific label file". The label file LF2 is an example of "first label file". The text "AAA" is an example of "print target object". The OB region OB1, the OB region OB2, and the OB region OB3 are examples of "first object region", "second object region", and "third object region", respectively. The csv file CF1 is an example of "first database file". The first print data corresponding to the label LB1 and the additional print data corresponding to the label LB2 are examples of "first print data" and "additional print data", respectively. The text "AAA", the text "BBB", and the text "XXX" are examples of "first text", "second text", and "third text", respectively. In Case A, the text "AAA", the text "BBB", and the text "XXX" are examples of "first text information", "second text information", and "third text information", respectively. In Case B, the QR Code QR1, the text figure "BBB", and the QR Code QR2 are examples of "first text information", "second text information", and "third text information", respectively. The image Im is an example of "specific image". The field names F1 and F2 are examples of "first field name" and "second field name", respectively. The selection of the compile button B4, the selection of the print button B3, and the selection of the database edit button B6 are examples of "preparation instruction", "first print instruction", and "additional instruction", respectively.

Second Embodiment; FIG. 9

Referring to FIG. 9, a second embodiment will be described. The second embodiment is different from the first embodiment in that the user can select a print target OB to be deleted from the intermediate label file for OB regions other than the image OB region. In order to implement this configuration, the OB tables included in the label files store flags in the second embodiment. FIG. 9 illustrates a continuation from FIG. 2.

As mentioned, the OB table OT1 included in the label file LF1 stores flags in association with OB names and field names. Each flag indicates one of: "YES" which indicates that a print target OB is to be deleted from an OB region corresponding to an OB name in the intermediate file when the compile button B4 is selected, and "NO" which indicates that a print target OB is not to be deleted from an OB region corresponding to an OB name. In an initial state, the OB names corresponding to the OB regions other than the image OB region are stored in association with the flags "YES", while the OB name corresponding to the image OB region is stored in association with the flag "NO". In the present embodiment, the user can set the flags associated with the OB names corresponding OB regions other than the image OB region. T422 in FIG. 9 is the same as T22 in FIG. 3.

In T424, the print app 30 accepts selection of the menu button B5 and then accepts selection of the setting button in the menu screen MS. In this case, the print app 30 displays a setting screen for setting the flag on the display unit 12, as illustrated in the lower left screen in FIG. 9. This setting screen includes a message that prompts the user to select an OB region that is not to be compiled (i.e., an OB region from which a print target OB is not to be deleted in the intermediate label file), OB names corresponding to OB regions other than the image OB region (which are "Text1" and "Text2" in the present embodiment), check boxes corresponding to the OB names, and an OK button.

In T426, the print app 30 accepts an operation of checking the check box corresponding to "Text2" in the setting screen and then accepts selection of the OK button. As a result, the flag associated with the OB name "Text2" is changed to "NO" in the OB table OT1 included in the label file LF1 (see the upper right diagram in FIG. 9).

Thereafter, upon accepting selection of the compile button B4 from the user in T428, the print app 30 executes the following processes. First, the print app 30 copies the label file LF1 to generate an intermediate label file identical with the label file LF1. In the intermediate label file, the print app 30 identifies the OB name "Text1" associated with the flag "YES" in the OB table OT1 and identifies the text OB region OB1 corresponding to the OB name. Then, the print app 30 deletes the text written in the identified text OB region OB1 (i.e., "AAA") from the intermediate label file. Thus, the print app 30 generates a label file LF2 that includes one text OB region OB1, the OB region OB2 in which the text "BBB" is written, and the image OB region OB3 in which the image Im is placed. The one text OB region OB1 from which the text has been deleted has the text "Text1", which indicates that this OB region is a text OB region, written therein.

Upon accepting the selection of the compile button B4 from the user, the print app 30 further generates a csv file CF2. The csv file CF2 is generated as follows. First, the print app 30 writes a single-row record including the one text "AAA", which has been deleted from the intermediate label file, in the csv file CF2.

The print app 30 then adds the field name F1 to the column in which the text "AAA" is written. Thus, the csv file CF2 in which the field name F1 is stored in association with the text "AAA" is generated.

Further, the print app 30 generates an OB table OT2 in the label file LF2. The OB table OT2 stores the OB name "Text1" corresponding to the text OB region OB1 from which the text "AAA" has been deleted, the field name F1, and the flag in association with each other. The field names associated with the OB names "Text2" and "Img" indicate blank in the OB table OT2 included in the label file LF2. The print app 30 further generates csv Information CI in the label file LF2.

The print app 30 accepts selection of the print button B3 from the user in T430. In this case, the print app 30 generates one piece of print data as follows. The print app 30 generates first print data based on the information in the first row in the csv file CF2 (i.e., "AAA"). Specifically, the print app 30 identifies the text "AAA" associated with the field name F1 in the csv file CF2. Then, the print app 30 identifies the OB name "Text1" associated with the field name F1 in the OB table OT2. The print app 30 then writes the identified text "AAA" in the OB region OB1 corresponding to the identified OB name "Text1". Thus, first print data is generated. The print app 30 sends the first print data to the label printer 50 via the wireless LAN I/F 14.

The label printer 50 receives the first print data from the portable terminal 10 via the wireless LAN I/F 56. The label printer 50 generates a label LB1 by printing a label image represented by the first print data onto a sticker. Thus, the print app 30 can cause the label printer 50 to execute printing using the csv file CF2 generated based on the label file LF1.

(Effects of Second Embodiment)

As with the first embodiment, the user can also easily generate the csv file CF2 in the second embodiment, and thus user convenience can be improved. Further, in the second embodiment, the user can select, for each OB region, whether the text written in the OB region is to be invariable or variable. Thus, for example, for a text that is to be printed on a plurality of labels among texts written in text OB regions, the user can select to make the text OB region in which that text is written invariable. The label file LF2 and the csv file CF2 are examples of "second label file" and "second database file", respectively. The first print data corresponding to the label LB1 is an example of "second print data". The selection of the print button B3 is an example of "second print instruction".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1) The label file including two text OB regions and one image OB region is described referring to Case A of the embodiments above, however, the combination of OB regions included in a label file is not limited to the combination of the embodiments. For example, a label file may include one text OB region or three or more text OB regions, may not include any image OB region, or may include two or more image OB regions.

(Modification 2) The upper right preview screen in FIG. 3 may not include the database edit button B6. In this case, the user may edit the csv file CF1 using an app (not illustrated) different from the print app 30 and import the edited csv file CF1 to the print app 30 so that the edited csv file CF1 may be used by the print app 30. In this modification, "add the third text" can be omitted.

(Modification 3) The print app 30 may generate print data based on information in all rows in the csv file CF1 without accepting, from the user, selection of a row in the csv file that corresponds to a label the user wishes to print. In another modification, the print app 30 may display a screen for selecting a row based on which print data is to be generated from among rows in the csv file CF1 when the print button B3 is selected in T30 of FIG. 3.

(Modification 4) An image obtained by coding a text is not limited to a QR Code but may be, for example, a barcode. Further, in the embodiments above, the object in which letters gradually increase in size toward the rightmost letter is taken as an example of "text figure", however, the text figure is not limited to such object. The text figure may be any object that is obtained by using text(s), such as an object in which texts are circularly arranged. Generally speaking, "figure obtained from the first text" may be any information so long as it is obtained from the text, such as a QR Code, a text figure, etc.

(Modification 5) In the embodiments above, the csv file CF1 including one row is generated and then this csv file CF1 is edited to include two rows. However, it is possible to generate a csv file including three or more rows by applying the technology disclosed herein.

(Modification 6) The processes described above are implemented by software (e.g., the print app 30), however, at least one of these processes may be implemented by hardware such as a logic circuit.

What is claimed is:

1. A non-transitory computer-readable recording medium storing computer-readable instructions for a terminal device, wherein the computer-readable instructions, when executed by a processor of the terminal device, cause the terminal device to:

in a case where a preparation instruction for printing using a database file is obtained in a state where a specific label file exists, generate a first label file based on the specific label file and a first database file associated with the first label file based on the specific label file, wherein the specific label file is generated, by the terminal device, based on interaction of the terminal device with a user, the specific label file includes one or more object regions in which a print target object is to be placed and first text information written in a first object region of the one or more object regions, and the first label file includes the one or more object regions and does not include the first text information, and the first database file stores a first field name corresponding to the first object region and a first text obtained by using the first text information in association with each other;

in a case where a first print instruction for printing using the first label file is obtained after the first label file and the first database file have been generated, generate first print data by using the first label file and the first database file associated with the first label file, wherein in the first print data, the first text information obtained by using the first text stored in the first database file is written in the first object region corresponding to the first field name associated with the first text; and send the first print data to a label printer.

2. The non-transitory computer-readable recording medium as in claim 1, wherein the specific label file further includes second text information written in a second object region of the one or more object regions, the second object region being different from the first object region, the first label file includes the one or more object regions and includes neither the first text information nor the second text information, the first database file stores the first field name and the first text in association with each other and stores a second field name corresponding to the second object region and a second text obtained by using the second text information in association with each other, and in the first print data, the first text information is written in the first object region and the second text information obtained by using the second text stored in the first database file is written in the second object region corresponding to the second field name associated with the second text.

3. The non-transitory computer-readable recording medium as in claim 2, wherein in a first case where the preparation instruction is obtained in a state where the specific label file that has accepted a first selection from the user exists, the first label file is generated, the first selection being for making information written in the second object region variable, in the first case, the first database file is generated, and in the case where the first print instruction is obtained after the first label file and the first database file have been generated, the first print data is generated, wherein the computer-readable instructions, when executed by the processor, further cause the terminal device to:

in a second case where the preparation instruction is obtained in a state where the specific label file that has accepted a second selection from the user exists, generate a second label file based on the specific label file, the second selection being for making information written in the second object region invariable, wherein the second label file includes the one or more object regions and the second text information written in the second object region, and does not include the first text information;

in the second case, generate a second database file associated with the second label file, wherein the second database file stores the first field name and the first text in association with each other, and does not store a second field name corresponding to the second object region and the second text obtained by using the second text information in association with each other;

in a case where a second print instruction for printing using the second label file is obtained after the second label file and the second database file have been generated, generate second print data by using the second label file and the second database file associated with the second label file, wherein in the second print data, the first text information obtained by using the first text stored in the second database file is written in the first object region corresponding to the first field name associated with the first text and the second text information included in the second label file is written in the second object region; and send the second print data to the label printer.

4. The non-transitory computer-readable recording medium as in claim 1, wherein the specific label file further includes a specific image placed in a third object region of the one or more object regions, the third object region being different from the first object region, the first label file includes the one or more object regions and the specific image placed in the third object region, and does not include the first text information, the first database file stores the first field name and the first text in association with each other, and does not store a third field name corresponding to the third object region and the specific image in association with each other, and in the first print data, the first text information is written in the first object region and the specific image included in the first label file is placed in the third object region.

5. The non-transitory computer-readable recording medium as in claim 1, wherein in a case where the first print instruction is obtained after the first label file and the first database file have been generated and a third text associated with the first field name has been added to the first database file, the first print data and additional print data are generated by using the first label file and the first database file, wherein in the additional print data, third text information obtained by using the third text stored in the first database file is written in the first object region corresponding to the first field name associated with the third text, and the first print data and the additional print data are sent to the label printer.

6. The non-transitory computer-readable recording medium as in claim 5, wherein the computer-readable instructions, when executed by the processor, further cause the terminal device to:

in a case where an addition instruction for addition of the third text associated with the first field name to the first database file is obtained, add the third text associated with the first field name to the first database file.

7. The non-transitory computer-readable recording medium as in claim 5, wherein in a case where the first print instruction that includes a selection of both of the first text and the third text is obtained, the first print data and the additional print data are generated, and in a case where the first print instruction that includes a selection of one of the first text and the third text is obtained, one of the first print data and the additional print data is generated according to the selection.

8. The non-transitory computer-readable recording medium as in claim 1, wherein the first text information is the first text.

9. The non-transitory computer-readable recording medium as in claim 1, wherein the first text information is a figure obtained from the first text.

10. A method performed by a terminal device, comprising:

in a case where a preparation instruction for printing using a database file is obtained in a state where a specific label file exists, generating a first label file based on the specific label file; and a first database file associated with the first label file based on the specific label file, wherein the specific label file is generated, by the terminal device, based on interaction of the terminal device with a user, the specific label file includes one or more object regions in which a print target object is to be placed and first text information written in a first object region of the one or more object regions, and the first label file includes the one or more object regions and does not include the first text information, and the first database file stores a first field name corresponding to the first object region and a first text obtained by using the first text information in association with each other;

in a case where a first print instruction for printing using the first label file is obtained after the first label file and the first database file have been generated, generating first print data by using the first label file and the first database file associated with the first label file, wherein in the first print data, the first text information obtained by using the first text stored in the first database file is written in the first object region corresponding to the first field name associated with the first text; and sending the first print data to a label printer.

* * * * *